US008996898B2

(12) United States Patent
Podgorny et al.

(10) Patent No.: US 8,996,898 B2
(45) Date of Patent: Mar. 31, 2015

(54) ALARM-BASED POWER SAVING MODE FOR ELECTRONIC DEVICE WHERE A POWER LATCH CONTROLS POWER SWITCH BASED ON A CONTROL VALUE

(75) Inventors: Michael E. Podgorny, Naperville, IL (US); Emad S. Isaac, Downers Grove, IL (US)

(73) Assignee: The Morey Corporation, Woodridge, IL (US)

( * ) Notice: Subject to any disclaimer, the term of this patent is extended or adjusted under 35 U.S.C. 154(b) by 260 days.

(21) Appl. No.: 13/454,375

(22) Filed: Apr. 24, 2012

(65) Prior Publication Data

US 2013/0283072 A1 Oct. 24, 2013

(51) Int. Cl.
*G06F 1/26* (2006.01)
*G06F 1/32* (2006.01)

(52) U.S. Cl.
CPC ............ *G06F 1/3203* (2013.01); *G06F 1/3287* (2013.01); *Y02B 60/1217* (2013.01); *Y02B 60/1278* (2013.01); *Y02B 60/1282* (2013.01)
USPC ........................................................ 713/320

(58) Field of Classification Search
CPC . G06F 1/3203; G06F 1/3287; Y02B 60/1217; Y02B 60/1278; Y02B 60/1282
See application file for complete search history.

(56) References Cited

U.S. PATENT DOCUMENTS

| | | | |
|---|---|---|---|
| 4,203,153 A * | 5/1980 | Boyd | ............................. 713/323 |
| 4,560,847 A | 12/1985 | Mori | |
| 4,685,023 A | 8/1987 | Heaston | |
| 4,706,073 A | 11/1987 | Vila Masot | |
| 4,994,934 A | 2/1991 | Bouhenguel | |
| 5,239,652 A * | 8/1993 | Seibert et al. | .................. 713/323 |
| 5,491,486 A | 2/1996 | Welles, II et al. | |
| 5,708,819 A | 1/1998 | Dunnihoo | |
| 5,715,465 A | 2/1998 | Savage et al. | |
| 5,791,880 A | 8/1998 | Wilson | |
| 5,987,613 A | 11/1999 | Busch et al. | |
| 6,140,928 A | 10/2000 | Shibuya et al. | |
| 6,538,346 B2 | 3/2003 | Pidutti et al. | |
| 6,998,986 B2 | 2/2006 | Smith | |
| 7,209,335 B2 | 4/2007 | Kanamori et al. | |
| 7,315,097 B2 | 1/2008 | Tajika | |
| 7,479,944 B2 * | 1/2009 | Casebolt et al. | .............. 345/157 |
| 2006/0107074 A1 * | 5/2006 | Tang et al. | .................... 713/300 |
| 2008/0094212 A1 * | 4/2008 | Breed | ........................... 340/541 |
| 2008/0231121 A1 | 9/2008 | Yang et al. | |
| 2009/0010671 A1 * | 1/2009 | Hashimoto | ..................... 399/88 |
| 2009/0083569 A1 * | 3/2009 | Carey et al. | ................... 713/600 |
| 2009/0284391 A1 * | 11/2009 | Berkobin et al. | ......... 340/870.01 |
| 2012/0159222 A1 * | 6/2012 | Frantz et al. | .................. 713/323 |

* cited by examiner

*Primary Examiner* — Thomas Lee
*Assistant Examiner* — Lin Lin Htay
(74) *Attorney, Agent, or Firm* — Vedder Price P.C.

(57) ABSTRACT

This disclosure relates to an alarm-based power saving mode and associated system implemented on a device for a microprocessor or a telematics circuitry, and more particularly, to an alarm and powered-up microprocessor-driven power latch for disabling a power source to a microprocessor or telematics circuitry at a power switch. A microprocessor and/or telematics circuitry are powered down by an instruction step from the microprocessor or the telematics circuitry by using a power switch to cut off power. The switch is controlled by a power latch, which is regulated by a wake-up value given to an alarm to enable the power latch and exercise power switch control, as well as by a value given directly by the microprocessor to enter the powered down mode.

11 Claims, 3 Drawing Sheets

ALARM-BASED POWER SAVING MODE FOR ELECTRONIC DEVICE WHERE A POWER LATCH CONTROLS POWER SWITCH BASED ON A CONTROL VALUE

FIELD OF THE DISCLOSURE

This disclosure relates to an alarm-based power saving mode for an electronic device having a microprocessor with or without telematics circuitry, and more particularly, to an alarm-driven power latch for disabling a power source to a microprocessor and/or to telematics circuitry at a power switch.

BACKGROUND

In an environmentally conscious era, improvements to power consumption of electronic devices equipped with batteries or connected to an external power network are important. All electronic devices rely on energy or power to perform their useful tasks. Low power consumption is one factor that bears on the usefulness of a device. To save energy, some devices, such as telematics circuitry, may be turned off during long periods of disuse.

Varied techniques and systems exist to manage power requirements or power usage of electronic devices, such as, for example, the design of more efficient circuitry, the use of control software layers with capacity to manage power consumption by optimizing tasks, the software management of energy waste associated with standby modes, and appropriate to this disclosure, hardwired systems designed to optimize the method of operation of a device to prevent power loss when the device is not in use.

The use of power saving modes is already known. Some devices use a sleep or standby mode of operation on microprocessors or other computer processor units to switch off some functions when they are not needed. One problem with these sleep or standby modes is the action require to awaken the device. Personal laptop computers often use this technology to conserve useful battery energy, but keyboards must remain powered to allow users to touch a key to awaken the device. In these systems, to preserve software functions and maintain parts of executed memory applications, the software layer must also remain partially active while being incapable of full interaction with the user. Upon an external command from a user, such as depressing a key on a keyboard, full functionality is turned back on and interaction with the user can resume once the software layer is fully reactivated. In these systems, the microprocessor remains enabled, and though operating at a lower level, still consumes energy.

Other power saving modes are directed at changing the performance requirements of the device. For example a personal computer in a power saving mode can have the display luminosity diminish substantially to conserve energy. Memory access drives can operate more slowly, and microprocessor clocks can be slowed to operate at colder and more energy-efficient levels. These are only a handful of possible energy-saving configurations known in the art.

U.S. Pat. No. 7,315,097 assigned to Fujitsu Limited is shown in FIG. 1 as part of the prior art. This reference is directed to a device for optimizing the power consumption of a device when certain conditions are met. A manual switch is used to energize the system using a latch circuit connected to a switch placed between an AC adapter and an over-current detection system. One obvious problem of this technology is the manual interruption mechanism. This system does not truly save power unless a user uses the switch, and users may then close the device altogether. To protect the electronic device, the system uses the latch circuit and turns off the circuit when an over-current is detected. The system is designed to protect the microprocessor against over-currents and requires a proximate user to energize the device. What is needed is a power saving mode capable of managing itself independent of the location of a proximate user and independent of over-current activity.

U.S. Patent Publication No. 2008/0231121 to Yang is shown in FIG. 2 as prior art. This device is an inline cutoff system for placement in a loop to interrupt the power in a system when a certain condition occurs. This technology is directed at the recognition of recognition of normal sleep modes in systems and then uses the switch and the switch unit to permanently cut off power in the system, which then requires manual reactivation. What is needed is a built-in power saving mode that is self-awakening and also capable of management of its power down mode without the use of residual power to the microprocessor.

Unlike computer microprocessors that need to remain partly powered or where some memory attached to the microprocessor needs to keep RAM memory intact, other microprocessors and associated telematics circuitry may be used at infrequent intervals and may be placed in a powerless state for long periods of time. What is needed is a system or configuration where a microprocessor or telematics circuitry can be permanently powered down and reactivated by the powered-down microprocessor using limited power from a battery based on a predetermined wake-up variable sent by the microprocessor to the system.

SUMMARY

This disclosure relates to an alarm-based power saving mode and associated system implemented on a device for a microprocessor or a telematics circuitry, and more particularly, to an alarm and powered-up microprocessor-driven power latch for disabling a power source to a microprocessor or telematics circuitry at a power switch. A microprocessor and/or telematics circuitry are powered down by an instruction step from the microprocessor or the telematics circuitry by using a power switch to cut off power. The switch is controlled by a power latch, which is regulated by a wake-up value given to an alarm to enable the power latch and exercise power switch control, as well as by a value given directly by the microprocessor to enter the powered down mode.

BRIEF DESCRIPTION OF THE DRAWINGS

Certain preferred embodiments are shown in the drawings. However, it is understood that the present disclosure is not limited to the arrangements and instrumentality shown in the attached drawings.

DETAILED DESCRIPTION

Figure 1:
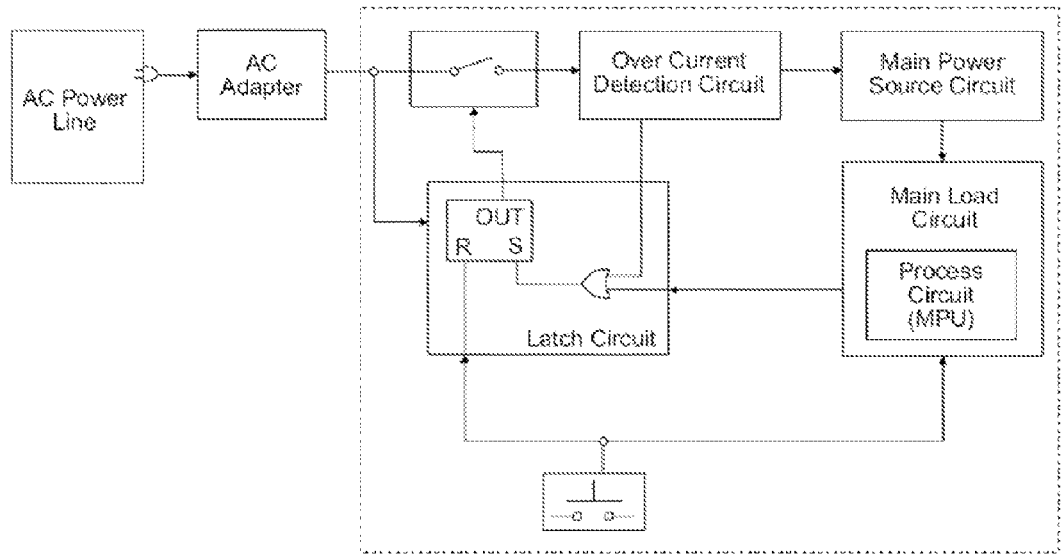
FIG. 1 is a power saving mode for an electronic device from the prior art.
Figure 2:
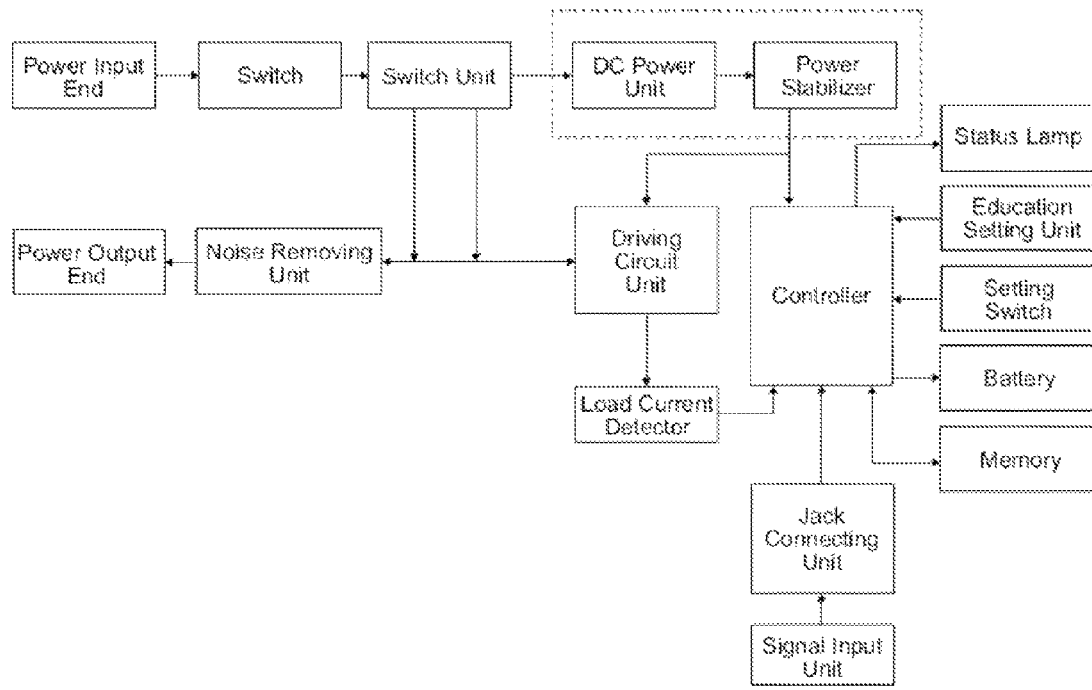
FIG. 2 is a second power saving mode for an electronic device from the prior art.

For the purposes of promoting and understanding the invention and principles disclosed herein, reference is now made to the preferred embodiments illustrated in the drawings, and specific language is used to describe the same. It is nevertheless understood that no limitation of the scope of the invention is thereby intended. Such alterations and further modifications in the illustrated devices and such further applications of the principles disclosed as illustrated herein are contemplated as would normally occur to one skilled in the art to which this disclosure relates.

Figure 3:
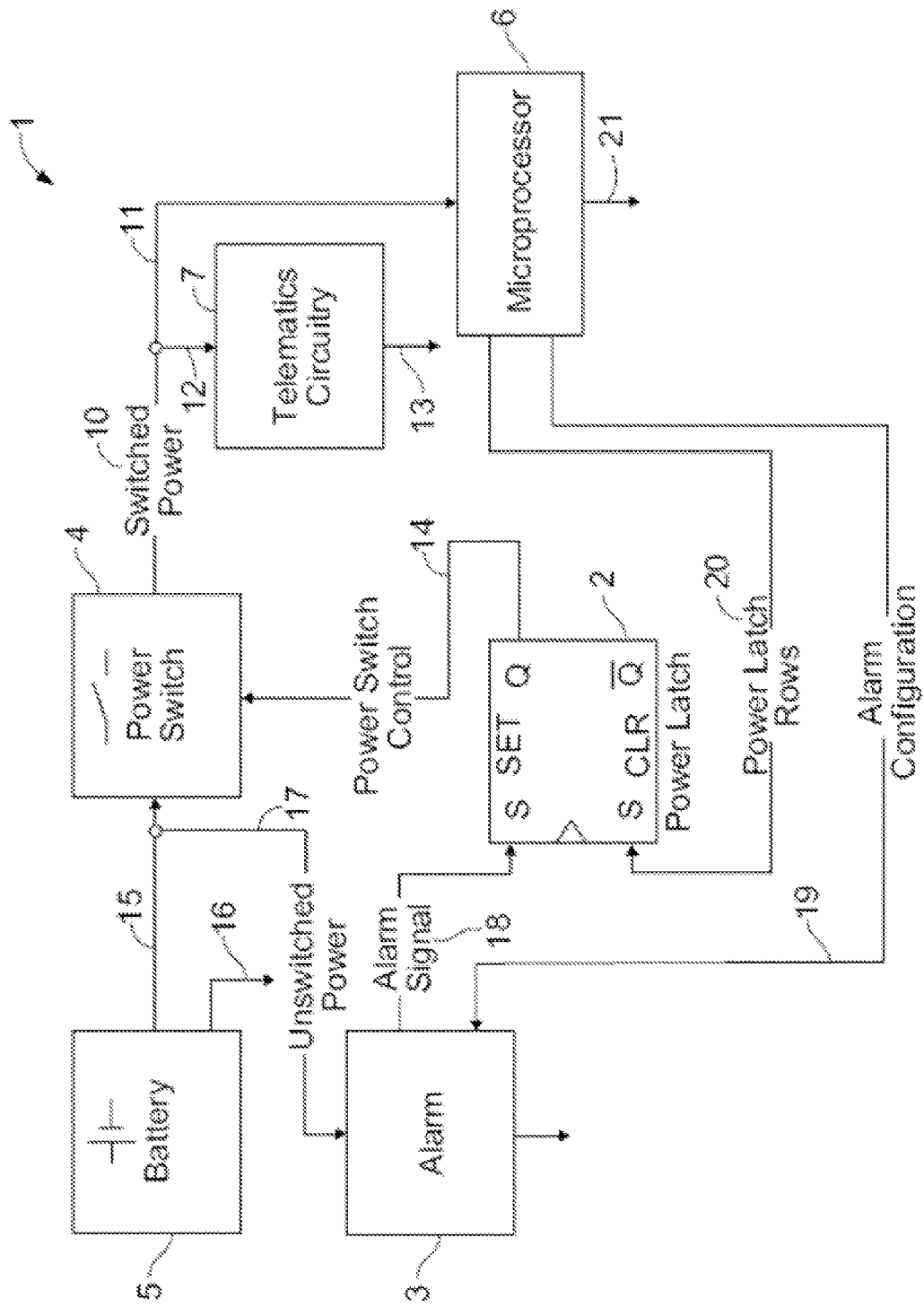
FIG. 3 is an alarm-based power saving mode for an electronic device and system according to an embodiment of the present disclosure.

The system and operating mode 1 as shown in FIG. 3 and described herein includes a power supply 5, such as a rechargeable or nonrechargeable battery, or any normal power source from a network in direct current or alternating current, a power switch 4, an alarm 3, a telematics circuitry 7, a microprocessor 6, and a power latch 2, along with the different connections between these elements 11 to 21. Terms used above are intended to be given their broadest reasonable interpretation in the art. Power switches 4 exist in a plurality of embodiments, in different sizes, and for different electronic applications. The power switch 4 and the power latch 2 may be of a substantial commercial size but may also be as small as nanosize equipment or be parts of an overall microcircuitry. These components, while shown in FIG. 3 using different boxes, are contemplated in any physical configuration, including elements that are distant on an electronic device to elements that are joined or merged into other electronic structures on a single device or a plurality of devices.

In addition to its ordinary meanings, the term "power switches" may also refer generally to an electromagnetic contactor or circuit breaker capable of either connecting or disjoining a conductor via a power control switch 14 activated from an external source so that power flows through the power switch 4. In one embodiment shown in FIG. 3, the power switch control 14 is a conductor that may be designed to open or close when a voltage is produced in the power switch control 14. In a preferred embodiment shown as the power saving mode of the device 1, a control 14 is used where a change in status on the power switch 4 is initiated by sending a small pulse of current to the control 14 and where the switch remains open even if the current is cut off. The use of a control switch 14 where the switch 4 is changed when current in the control 14 drops or when the current is turned off from a normally open state is also contemplated. One of ordinary skill in the art will understand the basic voltage levels and variability for different circuits for enabling action between different elements in a system. For example, in certain systems, a current having a voltage of 5 volts is needed, whereas in others, a different value of current is needed, and in yet other systems, variable current with a certain phase and amplitude is needed.

In one embodiment, power switches may be a plastic mounting base with a stationary conductive core formed by stacking silicon metal plates, a movable conductive core, which is made of laminated silicon metal plates, an operating coil to provide a drive force, which causes the stationary core to attract the movable core against the elastic force of a tripping spring, and a crossbar made of plastic with a window and holding the movable core at an end.

In the system 1 shown in FIG. 3, the power latch 2 includes a power latch rows 20 for input of information from the microprocessor 6, such as the arrival of a command to open the power switch 4 and thus cut the power to the microprocessor 6 and the telematics circuitry 7 by removing power to cables 10, 11, and 12. The power latch 2 may also include an internal system to retain an alarm configuration value from the microprocessor 6 or may also only be an all-or-nothing system that translates a value of the alarm signal 18 directly to the power switch control 14 for activation of the power switch if a baseline value is reached. In yet another embodiment, the alarm 3 remains powered even when the power switch 4 is opened and includes an alarm configuration value sent by the microprocessor 6 via the cable 19 to the alarm.

Telematics is the integrated use of telecommunications and informatics, also known generally as Information and Communication Technology. Telematics is the science of sending, receiving, and storing information via telecommunication devices. Recently, because of the development of Global Positioning Systems (GPS), telematics is often also applied specifically to navigational systems placed onboard in vehicles with integrated computers and mobile communication systems. Within the scope of this disclosure, the term "telematics" is to be construed broadly to include land-based asset tracking devices, vehicle tracking technology, fleet management control, satellite navigation, mobile data and mobile television telecommunication in vehicles, wireless vehicle safety communications, emergency warning onboard systems in vehicles, intelligent vehicle technologies, and automated vehicle-related services linked with vehicle movement.

The telematics circuitry 7 is a circuit used as part of a telematics system. The telematics circuitry 7 may include a microprocessor 6 or may rely on an external microprocessor, depending on the type of application. For example, a diesel generator may be installed in northern countries at a location that prohibits easy maintenance. The generator may be equipped with a telematics system operating in conjunction with a GPS antenna and a microprocessor in a computer system used to monitor the generator. Maintenance operations may be needed only each month, or maintenance operations may be conducted from a distance using a remote communication system via the GPS communication link. An alarm, in this case the GPS antenna receptor, may be programmed to turn on the telematics system only when a special signal is received.

What is contemplated is a power saving mode for an electronic device 1 with a microprocessor 6 and a telematics circuitry 7 having a power source 5, such as a battery, and a microprocessor 6 and a telematics circuitry 7 powered by the power source 5. The electronic device 1 also includes a power switch 4 on a power distribution line 10, 11, 12, and 15 between the power source 5 and the microprocessor 6 and the telematics circuitry 7 for energizing or powering off the telematics circuitry 7 and the microprocessor 6. The device 1 also includes a power latch 2 for controlling the power switch 4 at a power switch control 14 based on a control value sent from the microprocessor 6 to the power latch 2 via the power latch rows 20. Further, the device 1 also includes an alarm 3 with an external sensor powered by the power source 5 as shown at 17 with a configuration value sent by the microprocessor via the alarm configuration 19 to produce a signal alarm, which is sent back to the power latch 2 via the alarm signal cable 18. In one embodiment, the power switch 4 is closed to energize the microprocessor 6 and the telematics circuitry 7 as a result of the signal alarm reaching a value, such as the control value either in the alarm 3 or in the power latch 2, and the power switch 4 is opened to power off the microprocessor 6 and the telematics circuitry 7 at the request of the power latch controlled by the microprocessor.

FIG. 3 shows that some of the elements, such as, for example, the power source 5, microprocessor 6, and the telematics circuitry 7, may be grounded at numerals 16, 13, and 21, respectively. While several elements are shown to be grounded in this diagram, one of ordinary skill in the art of electronic circuit design will understand how to handle the different voltages associated with the battery 5 in any environment to create the needed voltage gradients.

In one embodiment, the alarm 3 is a real-time clock and the signal alarm is a preset time. For example, the microprocessor may send via the alarm configuration a time setting telling the alarm to send the alarm signal 18 back to the power latch 2 to enable the power switch 4. In another embodiment, the alarm is an environmental sensor such as a motion detector, a proximity detector, a light detector, or even a GPS communication link.

Figure 4:
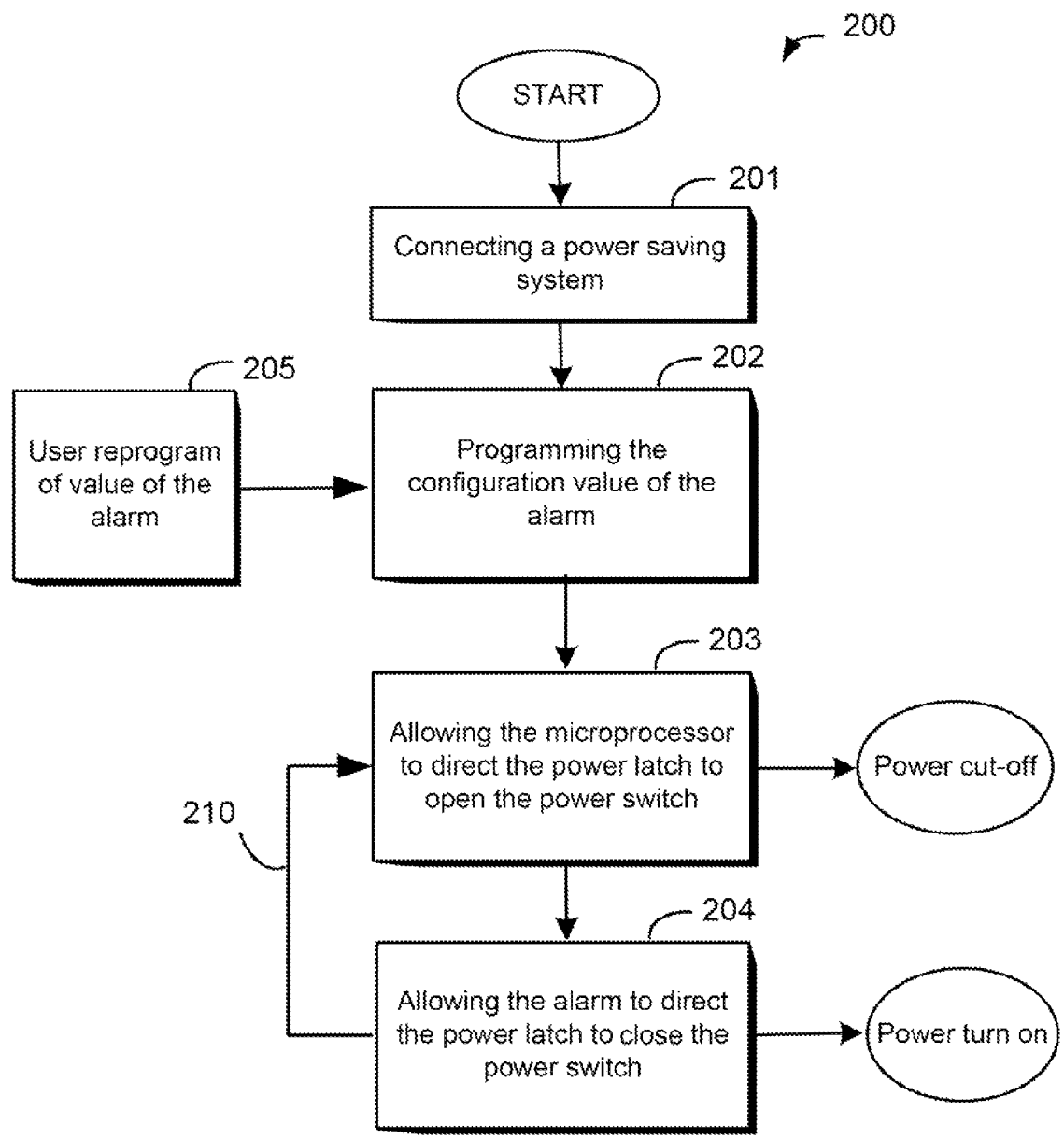
FIG. 4 is a diagram of the steps associated with a method for saving power at a power source of an electronic device with a microprocessor and telematics circuitry according to an embodiment of the present disclosure.

FIG. 4 shows the different steps of a method 200 for saving power at a power source of an electronic device as described above. The method includes the steps of connecting 201 a power saving system as described above and shown on FIG. 3, programming 202 into the microprocessor 6 the configuration value of the alarm 3 associated with a detection level of the alarm for the energizing of the microprocessor 6 and the telematics circuitry for closing the power switch 4 from the power latch 2, then allowing 203 the microprocessor 6 to direct the power latch 2 to open the power switch 4 for powering off the microprocessor 6 and the telematics circuitry 7 at a desired time, such as when the system needs to place itself in standby mode, and then allowing 204 the alarm 3 to direct the power latch 2 to close the power switch 4 for powering on the microprocessor 6 and the telematics circuitry 7 when the detection level of the alarm reaches the control value or any other detection or set-off value.

For example, in the diesel generator example given above, the GPS satellite receiver acting as the alarm may be in standby mode and capable of reading incoming signals and taking action down to the power latch 2 only upon the reception of a specific enabling signal. In another embodiment, the alarm may send decoded signals received directly to the power latch 2, which in turn has the capacity to decode the signal and enable the power switch control 14 to the power switch 4 only when the specific enabling signal is read.

In a further embodiment of the method 200, the last two steps 203, 204 of allowing the microprocessor 6 and the alarm 3 to direct the power latch 2 are repeated instead to operate the device in the power saving mode and include the subsequent step of allowing 203 a user to reprogram 205 the configuration value of the alarm via the microprocessor 6. In another embodiment, the method further comprises the alternate repetition 210 of the steps of turning on and turning off the power to the microprocessor 6 to enable the power saving mode.

Persons of ordinary skill in the art appreciate that although the teachings of this disclosure have been illustrated in connection with certain embodiments and methods, there is no intent to limit the invention to such embodiments and methods. On the contrary, the intention of this disclosure is to cover all modifications and embodiments falling fairly within the scope the teachings of the disclosure.

What is claimed is:

1. A power saving mode for an electronic device with a microprocessor and a telematics circuit, comprising:
    a power source;
    a microprocessor and a telematics circuit powered by the power source;
    a power switch on a power distribution line between the power source and the microprocessor and the telematics circuit for energizing or powering off the telematics circuit and the microprocessor;
    a power latch for controlling the power switch at a power switch control based on a control value sent from the microprocessor to the power latch; and
    an alarm with an external sensor powered by the power source with a configuration value sent by the microprocessor for producing a signal alarm to the power latch;
    wherein the power switch is closed to energize the microprocessor and the telematics circuit when the signal alarm reaches the control value, and wherein the power switch is opened to power off the microprocessor and the telematics circuit at the request of the power latch controlled by the microprocessor.

2. The power saving mode of claim 1, wherein the power source is a battery.

3. The power saving mode of claim 1, wherein the alarm is a real-time clock and the signal alarm is a preset time.

4. The power saving mode of claim 1, wherein the alarm is an environmental sensor.

5. The power saving mode of claim 1, wherein the environmental sensor is a proximity detector.

6. A method of saving power at a power source of an electronic device with a microprocessor and a telematics circuit, the method comprising the steps of:
    connecting a power saving system with a power source to a microprocessor and a telematics circuit powered by the power source, including a power switch on a power distribution line between the power source and the microprocessor and the telematics circuit for energizing or powering off the telematics circuitry and the microprocessor, a power latch for controlling the power switch at a power switch control based on a control value sent from the microprocessor to the power latch, and an alarm with an external sensor powered by the power source with a configuration value sent from the microprocessor for producing a signal alarm to the power latch;
    programming the configuration value of the alarm associated with a detection level of the alarm via the microprocessor to energize the microprocessor and the telematics circuit for the closing of the power switch from the power latch;
    allowing the microprocessor to direct the power latch to open the power switch to power off the microprocessor and the telematics circuit; and
    allowing the alarm to direct the power latch to close the power switch to power on the microprocessor and the telematics circuit when the detection level of the alarm reaches the control value.

7. The method for saving power of claim 6, wherein the power source is a battery.

8. The method for saving power of claim 6, wherein the alarm is a real-time clock and the signal alarm is a preset time.

9. The method for saving power of claim 6, wherein the environmental sensor is a proximity detector.

10. The method for saving power of claim 6, wherein the last two steps of allowing the microprocessor and the alarm to direct the power latch are repeated instead to operate the device in the power saving mode.

11. The method for saving power of claim 10, further comprising the step of allowing a user to reprogram the configuration value of the alarm via the microprocessor and reprogramming the configuration value of the alarm associated via the microprocessor with a new detection level of the alarm.

* * * * *